(12) United States Patent
Choi

(10) Patent No.: US 11,523,683 B2
(45) Date of Patent: Dec. 13, 2022

(54) BLOW-MOLDED UNITARY STRUCTURE WITH ENHANCED STRENGTH

(71) Applicant: Inno-Sports Co., Ltd., Xiamen (CN)

(72) Inventor: Kwan Jun Choi, Xiamen (CN)

(73) Assignee: Inno-Sports Co., Ltd., Xiamen (CN)

( * ) Notice: Subject to any disclaimer, the term of this patent is extended or adjusted under 35 U.S.C. 154(b) by 0 days.

(21) Appl. No.: 17/172,990

(22) Filed: Feb. 10, 2021

(65) Prior Publication Data

US 2021/0330073 A1 Oct. 28, 2021

(30) Foreign Application Priority Data

Apr. 23, 2020 (CN) .......................... 202020630767.3

(51) Int. Cl.
*A47B 13/08* (2006.01)
*B29C 49/00* (2006.01)
*B29L 31/44* (2006.01)

(52) U.S. Cl.
CPC .......... *A47B 13/08* (2013.01); *B29C 49/0031* (2013.01); *B29L 2031/448* (2013.01)

(58) Field of Classification Search
CPC ... A47B 3/0913; A47B 3/0912; A47B 3/0916; A47B 13/08; B29C 49/0031; B29L 2031/448
USPC ................... 108/161, 901, 27, 126, 130–133
See application file for complete search history.

(56) References Cited

U.S. PATENT DOCUMENTS

| | | |
|---|---|---|
| 893,364 A | 7/1908 | Piaser |
| 1,063,642 A | 6/1913 | Birdsell |
| 1,196,253 A | 8/1916 | Lowym |
| 1,599,971 A | 9/1926 | Melson |
| 2,136,569 A | 11/1938 | Trimpi |
| 2,572,333 A * | 10/1951 | Greitzer .................. A47B 1/05 108/90 |
| 2,803,033 A | 8/1957 | Rachman |
| 2,803,050 A | 8/1957 | Fernberg |
| 2,868,599 A | 1/1959 | Roggio |
| 3,027,209 A | 3/1962 | Nielsen |
| 3,075,809 A | 1/1963 | Wilson |
| 3,187,373 A | 6/1965 | Fisher |
| 3,188,138 A | 6/1965 | Lockshin |
| 3,368,504 A | 2/1968 | Cohen |
| 3,410,232 A | 11/1968 | Bills |
| 3,410,327 A | 11/1968 | Ausnit |
| 3,750,598 A | 8/1973 | Campbell |

(Continued)

FOREIGN PATENT DOCUMENTS

| | | |
|---|---|---|
| CA | 2971886 | 12/2018 |
| CN | 201767333 U | 3/2011 |

(Continued)

*Primary Examiner* — Janet M Wilkens
(74) *Attorney, Agent, or Firm* — Morgan, Lewis & Bockius LLP

(57) ABSTRACT

A blow-molded unitary structure includes a panel having upper and lower panel surfaces and a ridge extending downward beyond the lower panel surface. The ridge includes a first side surface, a second side surface, and a lower ridge surface joined with the first side and second side surfaces of the ridge. The ridge further includes a plurality of depressions formed at one or more of the first side surface, second side surface and lower ridge surface. The plurality of depressions enhances the strength of the ridge, and the ridge in turn enhances the strength of the structure.

19 Claims, 4 Drawing Sheets

(56) References Cited

U.S. PATENT DOCUMENTS

| | | |
|---|---|---|
| 3,861,328 A | 1/1975 | Lawless |
| 4,191,111 A | 3/1980 | Emmert |
| 4,244,471 A | 1/1981 | Plante |
| 4,285,105 A | 8/1981 | Kirkpatrick |
| 4,561,108 A | 12/1985 | Kamp |
| 4,597,553 A | 7/1986 | Rorabaugh |
| 4,773,108 A | 9/1988 | Leever |
| 4,792,240 A | 12/1988 | Ausnit |
| 5,180,064 A | 1/1993 | Elvin-Jensen |
| 5,226,372 A | 7/1993 | Frenkel |
| 5,325,794 A | 7/1994 | Hontani |
| 5,331,725 A | 7/1994 | Chou |
| 5,483,710 A | 1/1996 | Chan |
| 5,745,954 A | 5/1998 | Shogan |
| 5,857,229 A | 1/1999 | Magnani, Jr. |
| 6,062,589 A | 5/2000 | Cheng |
| 6,223,366 B1 | 5/2001 | Cheng |
| 6,223,628 B1 | 5/2001 | Barron |
| 6,354,230 B1 | 3/2002 | Maschio |
| 6,363,550 B1 | 4/2002 | Wang |
| 6,386,118 B1 | 5/2002 | Bendit |
| 6,508,262 B1 | 1/2003 | Takayama |
| 6,575,656 B2 | 6/2003 | Suh |
| 6,843,183 B2 | 1/2005 | Strong |
| 6,938,927 B1 | 9/2005 | Martin |
| 6,971,321 B1 | 12/2005 | Strong |
| 7,059,254 B2 | 6/2006 | Strong et al. |
| 7,066,676 B2 | 6/2006 | Tsai |
| 7,096,799 B2 | 8/2006 | Strong et al. |
| 7,097,380 B2 | 8/2006 | Lee |
| 7,144,078 B2 | 12/2006 | Hsieh |
| 7,171,910 B2 | 2/2007 | Neunzert et al. |
| 7,260,871 B2 | 8/2007 | Borchardt |
| 7,428,872 B2 | 9/2008 | Strong et al. |
| 7,475,643 B2 | 1/2009 | Haney et al. |
| 7,475,644 B2 | 1/2009 | Strong et al. |
| 7,634,969 B2 | 12/2009 | Neunzert et al. |
| 7,640,870 B2 | 1/2010 | Strong et al. |
| 7,644,667 B2 | 1/2010 | Strong et al. |
| 7,735,431 B2 | 6/2010 | Neunzert et al. |
| 7,849,867 B2 | 12/2010 | Takayama |
| 7,874,303 B2 | 1/2011 | Xie |
| 7,926,431 B2 | 4/2011 | Morris |
| 8,006,630 B2 | 8/2011 | Strong et al. |
| 8,033,228 B2 | 10/2011 | Haney et al. |
| 8,042,475 B2 | 10/2011 | Larcom et al. |
| 8,113,130 B2 | 2/2012 | Leng |
| 8,156,875 B2 | 4/2012 | Neunzert et al. |
| 8,302,541 B2 | 11/2012 | Haney et al. |
| 8,336,466 B2 | 12/2012 | Mani |
| 8,342,107 B2 | 1/2013 | Mover et al. |
| 8,534,205 B1 | 9/2013 | Johnson et al. |
| 8,578,865 B2 | 11/2013 | Haney et al. |
| 8,622,007 B2 | 1/2014 | Peery et al. |
| 8,707,478 B2 | 4/2014 | Jin |
| 8,746,155 B2 | 6/2014 | Haney et al. |
| 8,757,069 B2 | 6/2014 | Peery et al. |
| 8,806,677 B1 | 8/2014 | Bartelsmeyer |
| 8,856,984 B1 | 10/2014 | Donham |
| 8,888,123 B1 | 11/2014 | Cheng |
| 8,904,943 B2 | 12/2014 | Jin |
| 9,027,952 B2 | 5/2015 | Zhu |
| 9,103,368 B2 | 8/2015 | Mendes |
| 9,107,509 B2 | 8/2015 | Lee |
| D748,418 S | 2/2016 | Johnson et al. |
| 9,248,072 B2 | 2/2016 | Wu |
| 9,254,046 B1 | 2/2016 | Arenstein |
| 9,277,808 B2 | 3/2016 | Cai et al. |
| 9,282,812 B2 | 3/2016 | Chang |
| 9,314,386 B1 | 4/2016 | Boyd |
| D756,694 S | 5/2016 | Johnson et al. |
| 9,351,563 B2 | 5/2016 | Bennett et al. |
| 9,456,698 B2 | 10/2016 | Oh |
| 9,532,645 B1 | 1/2017 | Lin |
| 9,907,405 B2 | 3/2018 | An |
| 10,021,986 B1 | 7/2018 | Lin |
| 10,123,629 B2 | 11/2018 | Choi |
| 10,125,801 B2 | 11/2018 | Wilson |
| 10,285,506 B2 | 5/2019 | Choi |
| 10,470,561 B2 | 11/2019 | Clegg et al. |
| 10,806,246 B1 * | 10/2020 | Chen ............... A47B 3/087 |
| 11,286,083 B2 | 3/2022 | Lee |
| 2003/0009848 A1 | 1/2003 | Kuo |
| 2003/0089286 A1 | 5/2003 | Wang |
| 2003/0233967 A1 * | 12/2003 | Lin ............... A47B 13/003 |
| | | 108/129 |
| 2005/0005826 A1 | 1/2005 | Strong |
| 2005/0011422 A1 * | 1/2005 | Wen ............... A47B 3/0912 |
| | | 108/129 |
| 2005/0097829 A1 | 5/2005 | Seo |
| 2005/0193927 A1 | 9/2005 | Herring |
| 2005/0241550 A1 | 11/2005 | Neunzert |
| 2005/0274304 A1 | 12/2005 | Strong |
| 2005/0279260 A1 | 12/2005 | Stanford |
| 2006/0062632 A1 | 3/2006 | Jang |
| 2006/0196395 A1 | 9/2006 | Lin |
| 2006/0236902 A1 * | 10/2006 | Haney ............... A47B 13/08 |
| | | 108/57.16 |
| 2007/0012346 A1 | 1/2007 | Choi |
| 2007/0079441 A1 | 4/2007 | Chen |
| 2007/0199483 A1 * | 8/2007 | Peery ............... A47B 3/0912 |
| | | 108/132 |
| 2008/0078310 A1 | 4/2008 | VanNimwegen |
| 2009/0114129 A1 | 5/2009 | Smith |
| 2009/0133191 A1 | 5/2009 | Harrow |
| 2009/0255564 A1 | 10/2009 | Xie |
| 2010/0043676 A1 | 2/2010 | Apps |
| 2010/0176634 A1 | 7/2010 | Wahl |
| 2010/0192813 A1 | 8/2010 | Fry |
| 2010/0251941 A1 | 10/2010 | Muirhead |
| 2010/0299831 A1 | 12/2010 | Lee |
| 2011/0099712 A1 | 5/2011 | Jin |
| 2012/0107037 A1 | 5/2012 | Huang |
| 2012/0141195 A1 | 6/2012 | Lu |
| 2012/0222216 A1 | 9/2012 | Jin |
| 2013/0000528 A1 | 1/2013 | Jin |
| 2013/0025509 A1 | 1/2013 | Jin |
| 2013/0067659 A1 | 3/2013 | Oh |
| 2013/0133557 A1 | 5/2013 | Yoshinaga |
| 2013/0233210 A1 | 9/2013 | Jin |
| 2013/0276228 A1 | 10/2013 | Hsieh |
| 2014/0030012 A1 | 1/2014 | Lee |
| 2014/0070070 A1 | 3/2014 | Shinoda |
| 2014/0099155 A1 | 4/2014 | Chen |
| 2014/0130837 A1 | 5/2014 | Sy-Facunda |
| 2015/0130250 A1 | 5/2015 | Masunaga |
| 2015/0143630 A1 | 5/2015 | Harrow |
| 2015/0320225 A1 | 11/2015 | Boyd |
| 2015/0327684 A1 | 11/2015 | Lee |
| 2016/0157620 A1 | 6/2016 | Oh |
| 2016/0348395 A1 | 12/2016 | Jin |
| 2017/0013955 A1 | 1/2017 | Lin |
| 2017/0122353 A1 | 5/2017 | Halliburton |
| 2018/0153302 A1 | 6/2018 | Jiang |
| 2018/0192768 A1 | 7/2018 | Choi |
| 2019/0150608 A1 | 5/2019 | Johnson et al. |
| 2019/0200753 A1 | 7/2019 | Choi |
| 2019/0283304 A1 * | 9/2019 | Lin ............... A47B 13/08 |
| 2019/0284831 A1 | 9/2019 | Volin |
| 2019/0292808 A1 | 9/2019 | Dotterweich |
| 2020/0029684 A1 | 1/2020 | Jiang |
| 2020/0231333 A1 | 7/2020 | Holm |
| 2020/0245757 A1 * | 8/2020 | Jones ............... A47B 13/003 |
| 2021/0031831 A1 * | 2/2021 | Yoshizaki ......... B62D 15/0245 |
| 2021/0147111 A1 | 5/2021 | Lopez Uran |
| 2021/0354876 A1 | 11/2021 | Turner |

FOREIGN PATENT DOCUMENTS

| | | |
|---|---|---|
| CN | 204336376 U | 5/2015 |
| CN | 204336377 U | 5/2015 |
| CN | 209185860 U | 8/2019 |
| CN | 213464190 * | 6/2021 |

(56) References Cited

FOREIGN PATENT DOCUMENTS

| | | | |
|---|---|---|---|
| DE | 29515948 | | 1/1996 |
| EP | 1492432 | B1 | 10/2016 |
| EP | 1701552 | * | 7/2018 |
| GB | 810195 | A | 3/1959 |
| WO | WO 2013000149 | A1 | 1/2013 |

* cited by examiner

BLOW-MOLDED UNITARY STRUCTURE WITH ENHANCED STRENGTH

CROSS-REFERENCE TO RELATED APPLICATIONS

The present application claims priority to Chinese Utility Model Application CN 202020630767.3 filed Apr. 23, 2020. The disclosure of the application is incorporated herein for all purposes by reference in its entirety.

FIELD OF THE INVENTION

The present invention generally relates to blow-molded structures and, in particular, to blow-molded unitary structures with enhanced strength.

BACKGROUND

Some existing tabletops are made by blow molding plastics. Such tabletops are usually hollow structures with insufficient strength. In use or during transportation, they can be easily bent and deformed.

Given the current state of the art, there remains a need for blow-molded structures that address the abovementioned issues.

The information disclosed in this Background section is provided for an understanding of the general background of the invention and is not an acknowledgement or suggestion that this information forms part of the prior art already known to a person skilled in the art.

SUMMARY OF THE INVENTION

The present disclosure provides blow-molded unitary structures with enhanced strength. The structures can be used, for instance, as a tabletop, a benchtop, a countertop, or the like.

In various exemplary embodiments, the present disclosure provides a blow-molded unitary structure including a panel and a ridge. The panel includes upper and lower panel surfaces. The ridge extends downward beyond the lower panel surface, and includes a first side surface, a second side surface and a lower ridge surface joined with the first and second side surfaces of the ridge. A plurality of depressions is formed at one or more of the first side, second side and lower ridge surfaces to enhance a strength of the ridge. The plurality of depressions includes a plurality of first depressions spaced apart along a length direction of the ridge, and each of the first depressions is recessed from the lower ridge surface toward the upper panel surface.

In some exemplary embodiments, the ridge extends downward from a portion of a perimeter of the panel or from the entire perimeter of the panel. In such embodiments, the first side surface is joined with the lower panel surface of the panel and the second side surface is joined with the upper panel surface of the panel.

In some exemplary embodiments, the panel has a substantially rectangular, square, or circular shape.

In some exemplary embodiments, the blow-molded unitary structure is a tabletop, or a tabletop unit.

In an exemplary embodiment, each first depression forms no contact with the upper panel surface of the panel.

In an exemplary embodiment, each first depression is elongated along the length direction of the ridge.

In some exemplary embodiments, the plurality of depressions further includes one or more second depressions, each recessed from the lower ridge surface toward the upper panel surface, wherein the first and second depressions are different in length.

In some exemplary embodiments, the plurality of depressions further includes one or more third depressions formed at or adjacent to an edge between the lower ridge surface and first side surface of the ridge such that each of the one or more third depressions is recessed from the lower ridge surface toward the lower panel surface of the panel and recessed from the first side surface toward the second side surface of the ridge.

In some exemplary embodiments, the plurality of depressions further includes one or more fourth depressions each recessed from the first side surface toward the second side surface of the ridge at a location adjacent to the lower panel surface and joined with a third depression in the one or more third depressions.

In an exemplary embodiment, a fourth depression in the one or more fourth depressions has a different dimension along the length direction of the ridge than a corresponding third depression in the one or more third depressions.

In an exemplary embodiment, a fourth depression in the one or more fourth depressions is recessed from the first side surface toward the second side surface of the ridge at a different depth than a corresponding third depression in the one or more third depressions.

In various exemplary embodiments, the present disclosure provides a blow-molded unitary structure including a panel and a ridge. The panel includes upper and lower panel surfaces. The ridge extends downward beyond the lower panel surface, and includes a first side surface, a second side surface and a lower ridge surface joined with the first side and second side surface of the ridge. A plurality of depressions is formed at one or more of the first side, second side and lower ridge surfaces, thereby enhancing ridge strength. The plurality of depressions includes one or more first depressions, one or more second depressions, and one or more third depressions. The one or more first and second depressions are spaced apart along a length direction of the ridge, each recessed from the lower ridge surface toward the upper panel surface. The one or more third depressions are formed at or adjacent to an edge between the lower ridge surface and first side surface of the ridge such that each third depression in the one or more third depressions is recessed from the lower ridge surface toward the lower panel surface of the panel and recessed from the first side surface toward the second side surface of the ridge. A respective third depression in the one or more third depressions is formed in between a corresponding first depression in the one or more first depressions and a corresponding second depression in the one or more second depressions, or in between two adjacent first depressions, or in between two adjacent second depressions.

In an exemplary embodiment, the corresponding first and second depressions are substantially the same, or have different dimensions along a length direction of the ridge.

In some exemplary embodiments, the plurality of depressions further includes a fourth depression recessed from the first side surface toward the second side surface of the ridge at a location adjacent to the lower panel surface and joined with the respective third depression in the one or more third depressions.

In an exemplary embodiment, the fourth depression has a different dimension along the length direction of the ridge than the respective third depression, or the fourth depression is recessed from the first side surface toward the second side surface of the ridge at a different depth than the respective third depression, or both.

In an exemplary embodiment, for each respective third depression in the one or more third depression, there is a corresponding fourth depression.

In various exemplary embodiments, the present disclosure provides a blow-molded unitary structure including a panel and a ridge. The panel includes upper and lower panel surfaces. The ridge extends downward beyond the lower panel surface, and includes a first side surface, a second side surface and a lower ridge surface joined with the first side and second side surface of the ridge. A plurality of depressions is formed at one or more of the first side, second side, and lower ridge surfaces to enhance ridge strength. The plurality of depressions includes a third depression formed at or adjacent to an edge between the lower ridge surface and first side surface of the ridge such that the third depression is recessed from the lower ridge surface toward the lower panel surface of the panel and recessed from the first side surface toward the second side surface of the ridge. The plurality of depressions further includes a fourth depression recessed from the first side surface toward the second side surface of the ridge at a location adjacent to the lower panel surface and joined with the third depression.

In an exemplary embodiment, the third and fourth depressions have different dimensions along a length direction of the ridge, or the fourth depression is recessed from the first side surface toward the second side surface of the ridge at a different depth than the third depression, or both.

In an exemplary embodiment, the plurality of depressions includes two or more third depressions spaced apart along the length direction of the ridge and two or more fourth depressions.

The structures of the present disclosure have other features and advantages that will be apparent from, or are set forth in more detail in, the accompanying drawings, which are incorporated herein, and the following Detailed Description, which together serve to explain certain principles of exemplary embodiments of the present disclosure.

BRIEF DESCRIPTION OF THE DRAWINGS

The accompanying drawings, which are incorporated into and constitute a part of this specification, illustrate one or more exemplary embodiments of the present disclosure and, together with the Detailed Description, serve to explain the principles and implementations of exemplary embodiments of the invention.

Figure 1:
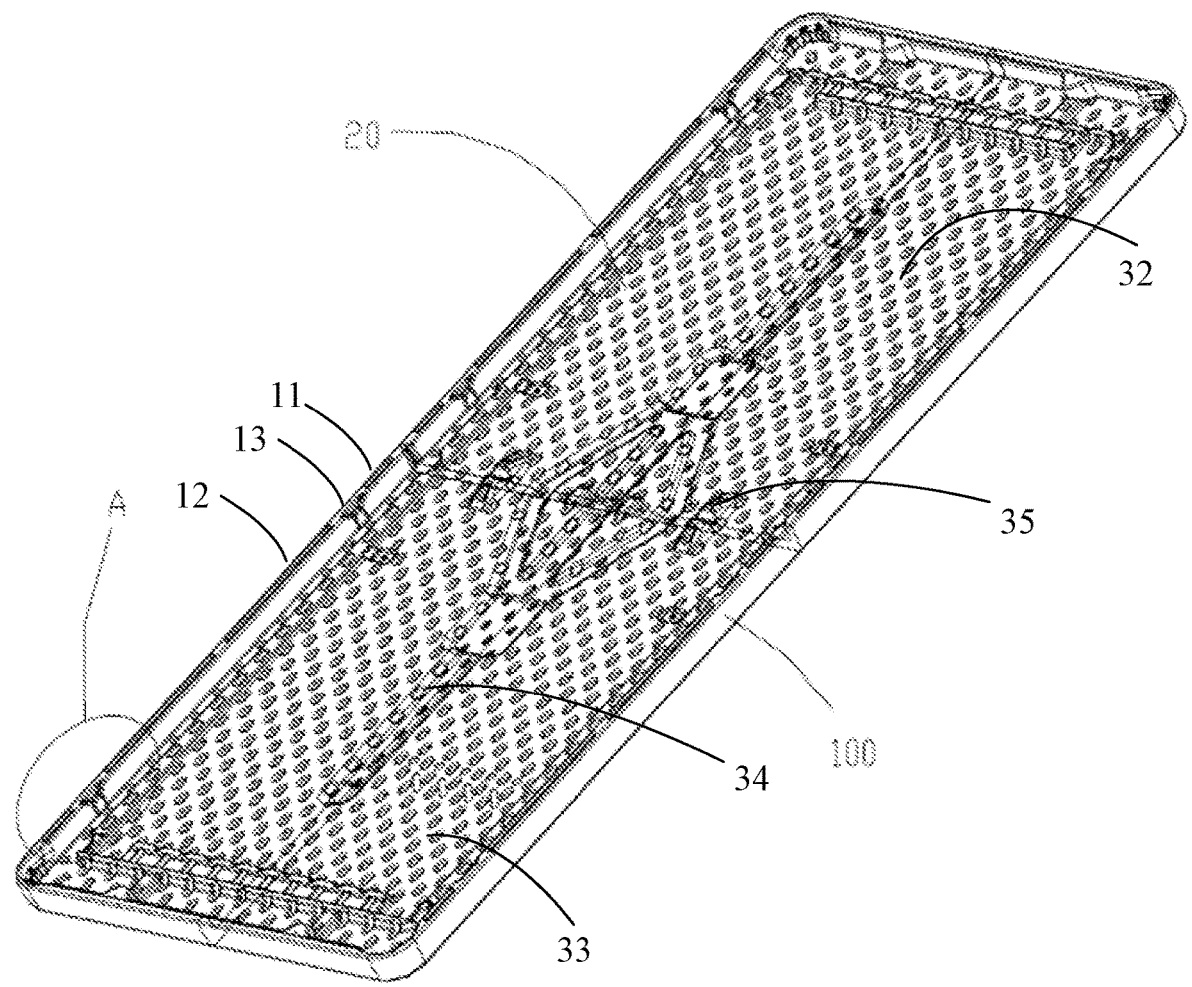
FIG. 1 is a bottom perspective view illustrating an exemplary structure in accordance with exemplary embodiments of the present disclosure.

As will be apparent to those of skill in the art, the components illustrated in the figures described above are combinable in any useful number and combination. The figures are intended to be illustrative in nature and are not limiting.

DETAILED DESCRIPTION

Reference will now be made in detail to implementations of exemplary embodiments of the present disclosure as illustrated in the accompanying drawings. The same reference indicators will be used throughout the drawings and the following detailed description to refer to the same or like parts. Those of ordinary skill in the art will understand that the following detailed description is illustrative only and is not intended to be in any way limiting. Other embodiments of the present disclosure will readily suggest themselves to such skilled persons having benefit of this disclosure.

In the interest of clarity, not all of the routine features of the implementations described herein are shown and described. It will be appreciated that, in the development of any such actual implementation, numerous implementation-specific decisions are made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Many modifications and variations of the exemplary embodiments set forth in this disclosure can be made without departing from the spirit and scope of the exemplary embodiments, as will be apparent to those skilled in the art. The specific exemplary embodiments described herein are offered by way of example only, and the disclosure is to be limited only by the terms of the appended claims, along with the full scope of equivalents to which such claims are entitled.

Embodiments of the present disclosure are described in the context of structures with enhanced strength. An exemplary structure of the present invention is a unitary piece formed by blow molding plastics such as high density polyethylene (HDPE), low density polyethylene (LDPE), polypropylene (PP), polyvinyl chloride (PVC), polyethylene terephthalate (PET), thermoplastic elastomers (TPE), or the like. An exemplary structure of the present disclosure can be used, for instance, as a tabletop, a benchtop, a countertop, or the like.

An exemplary structure of the present disclosure generally includes a panel with upper and lower panel surfaces and a ridge extending downward beyond the lower panel surface. The ridge includes a first side surface, a second side surface and a lower ridge surface joined with the first side and second side surfaces of the ridge. A plurality of depressions is formed at one or more of the first side, second side and lower ridge surfaces to enhance the strength of the ridge. In turn, the ridge enhances the strength of the structure (e.g., increases rigidity of the structure) and thus prevents the structure from bending, warping or deforming.

The panel can be of various shapes including, but not limited to, a square shape, a round shape or a rectangular shape. The ridge can be formed at any suitable position relative to the panel. For instance, the ridge can be formed at or adjacent to an edge of the panel, at or adjacent to the entire perimeter of the panel, or at a position away from an edge of the panel. The ridge can also be straight or curved or composed of straight and curved segments. For instance, in an exemplary embodiment, at least a portion of the ridge is straight, e.g., a ridge formed at an edge of a rectangular or square panel. In another exemplary embodiment, at least a portion of the ridge is curved, e.g., a ridge formed along a portion of the perimeter of a circular or oblong panel.

Figure 2:
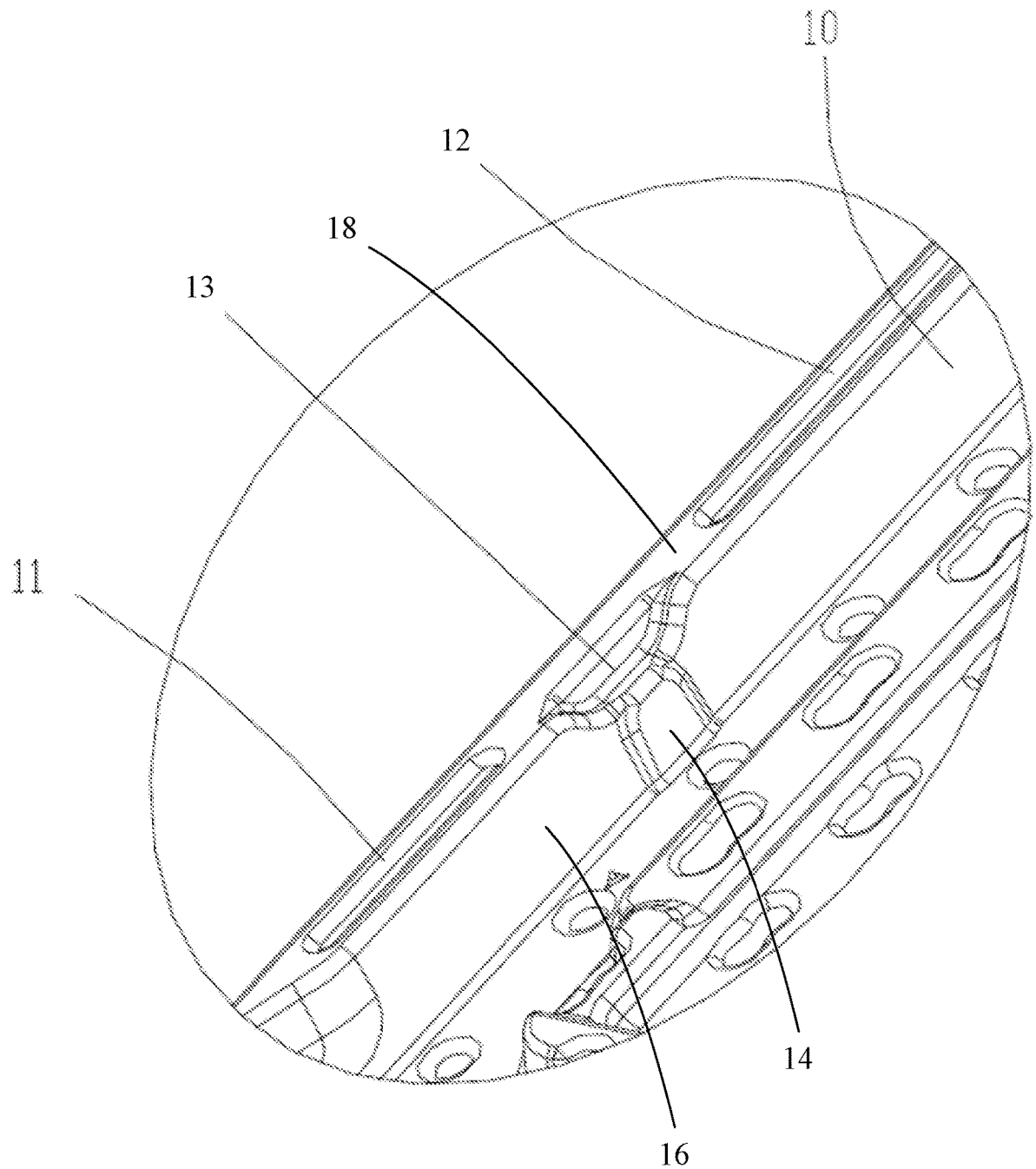
FIG. 2 is an enlarged view taken along oval A of FIG. 1.
Figure 3:
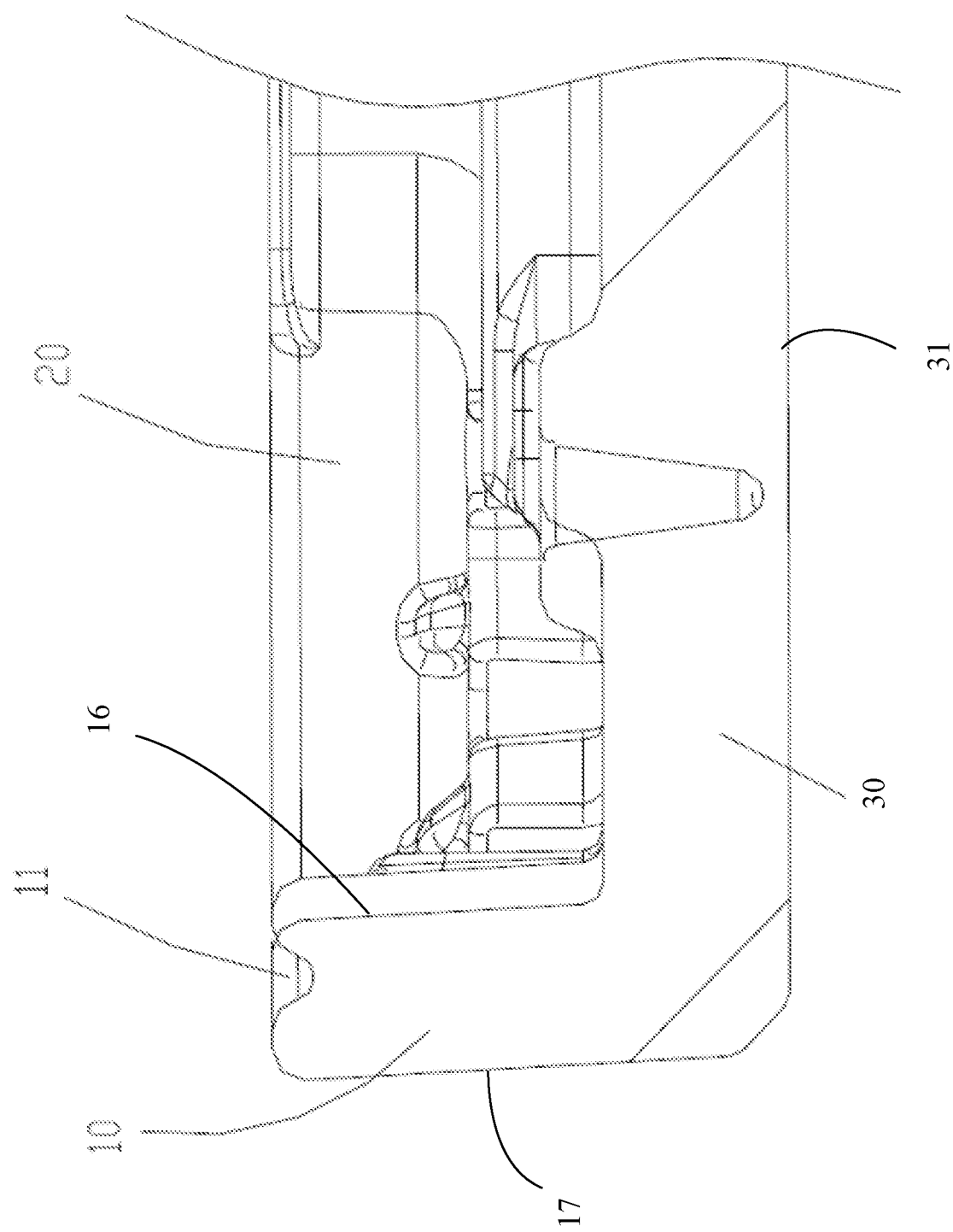
FIG. 3 is a partially cutout view illustrating the exemplary structure of FIG. 1.
Figure 4A:
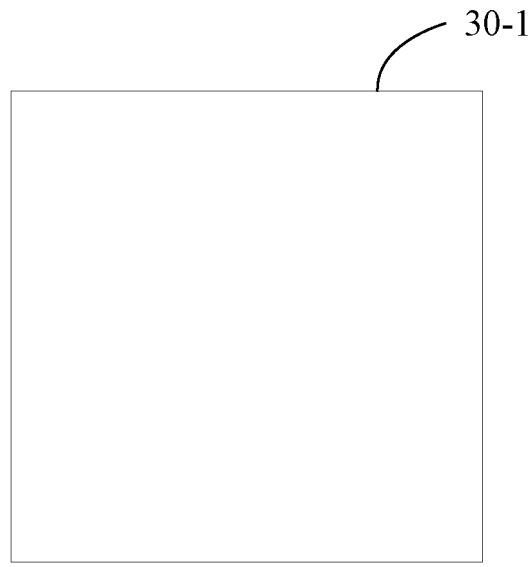
FIG. 4A shows an exemplary panel 30-1 having a substantially square shape.
Figure 4B:
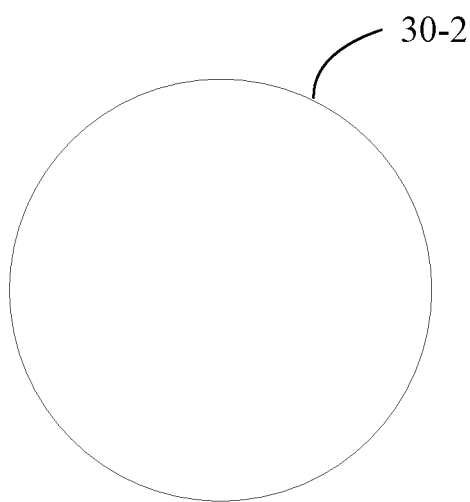
FIG. 4B shows an exemplary panel 30-2 having a substantially circular shape.

By way of example, FIGS. 1-3 illustrate exemplary structure 100 (a tabletop) including panel 30 and ridge 10. While ridge 10 is illustrated to be along substantially the entire perimeter of the panel, it should be noted that this is a non-limiting example. For instance, in an exemplary embodiment, the ridge of a structure is formed along a portion of perimeter of the panel. An example of such an embodiment is a structure resembling a panel unit, e.g., the lower or upper half of structure 100 in FIG. 1, in which, one or more edges of the panel unit is not formed with a ridge. In an exemplary embodiment, two such panel units are coupled with each other to make a foldable tabletop.

Panel 30 includes upper and lower panel surfaces such as upper panel surface 31 and lower panel surface 32. The upper and lower surfaces are spaced apart from each other, with a generally hollow space in between. In some exemplary embodiments, to enhance the strength of the panel and/or to engage with an element of a supporting frame, the lower surface is formed with a plurality of depressions such as depression 33, one or more channels such as channel 34, and/or one or more protrusions such as protrusion 35. The depressions and channels are generally recessed toward the upper surface.

The ridge extends downward beyond the lower panel surface of the panel and includes a first side surface, a second side surface, and a lower ridge surface joined with the first side and second side surfaces of the ridge. For instance, in some exemplary embodiments, ridge 10 extends downward beyond the lower panel surface of panel 30 and includes first side surface 16, second side surface 17, and lower ridge surface 18 joined with the first side and second side surfaces of the ridge. In some exemplary embodiments, the first side surface of the ridge is joined with the lower panel surface of the panel and the second side surface of the ridge is joined with the upper panel surface of the panel. In embodiments (such as that illustrated in FIG. 1) where the ridge is formed at or adjacent to a substantial portion of the perimeter of the panel, a space such as space 20 is formed collectively by the first side surface of the ridge and the lower surface of the panel. The space can be used to accommodate a supporting frame.

The first side and second side surfaces of the ridge are spaced apart from each other, with a generally hollow space in between. To enhance the strength of the ridge, in various exemplary embodiments, a plurality of depressions is formed at one or more of the first side, second side and lower ridge surfaces. The plurality of depressions can have any suitable shapes, sizes or orientations. For instance, a depression can have a regular (e.g., rectangular, square, circular, oblong or the like) or irregular shape. In addition, adjacent depressions can have the same configuration or different configurations.

For instance, in some exemplary embodiments, one or more depressions 11 are formed at the ridge, each recessed from the lower ridge surface toward the upper panel surface. Depressions 11 are spaced apart along the length direction of the ridge. In embodiments where the ridge is curved or includes one or more curved segment, the length direction of the ridge refers to the local arch length direction at which the depression is located. Depression 11 can form or not form contact with the upper or lower panel surface of the panel. In an exemplary embodiment, depression 11 is a dent, a groove or the like on the lower ridge surface and forms no contact with the upper or lower panel surface of the panel, e.g., the depth of depression 11 is smaller than the distance between the lower ridge surface and the lower panel surface and smaller than the distance between the lower ridge surface and the upper panel surface such that depression 11 does not contact the upper or lower panel surface of the panel.

In some exemplary embodiments, depression 11 is elongated along the length direction of the ridge. For instance, in some exemplary embodiments, depression 11 has a length (e.g., the dimension along the length direction of the ridge) that is more than 1.5 times, more than 2 times, more than 3 times, more than 5 times, or more than 10 times of its width (e.g., the dimension in a direction from the first side surface to the second side surface of the ridge).

In some exemplary embodiments, one or more depressions 12 are formed at the ridge, each recessed from the lower ridge surface toward the upper panel surface. In an exemplary embodiment, depression 12 is substantially the same as depression 11. In another exemplary embodiment, depression 12 is different than depression 11. For instance, by way of example, FIG. 1 illustrates depression 12 having a longer length than depression 11. In an exemplary embodiment, depression 12 is more than 1.5 times, more than 2 times, more than 3 times, or more than 5 times longer than depression 11.

Depressions 11 and 12 are combinable in any useful numbers and combinations. For instance, in an exemplary embodiment, one depression 12 is formed between two adjacent depressions 11. In another exemplary embodiment, two or more depressions 12 are formed between two adjacent depressions 11. Similarly, in an exemplary embodiment, one depression 11 is formed between two adjacent depressions 12. In another exemplary embodiment, two or more depressions 11 are formed between two adjacent depressions 12.

In some exemplary embodiments, one or more depressions 13 are formed at the ridge, each recessed from the lower ridge surface toward the lower panel surface of the panel and recessed from the first side surface toward the second side surface of the ridge. Depression 13 can form or not form contact with the lower panel surface of the panel. Similarly, depression 13 can form or not form contact with the second side surface of the ridge. In an exemplary embodiment, depression 13 forms no contact with either the lower panel surface of the panel or the second side surface of the ridge.

Depression 13 can be formed at any suitable locations with respect to depression 11 or depression 12. For instance, by way of example, FIG. 2 illustrates depression 13 formed between depression 11 and depression 12. It should be noted that this is a non-limiting example. For instance, depression 13 can be formed between two adjacent depressions 11 or two adjacent depressions 12. In some exemplary embodiments, there is at least one depression 13 formed between depression 11 and depression 12, and at least one depression 13 formed between two adjacent depressions 11 or two adjacent depressions 12.

In some exemplary embodiments, one or more depressions 14 are formed at the ridge, each recessed from the first side surface toward the second side surface of the ridge at a location adjacent to the lower panel surface of the panel and joined with depression 13. The number of depressions 14 can be the same as or different from the number of depressions 13. In an exemplary embodiment, corresponding to each depression 13, there is one depression 14 formed and joined with the respective depression 13.

Depression 14 can have a different dimension along the length direction of the ridge than depression 13. Depression 14 can also be recessed from the first side surface toward the second side surface of the ridge at a different depth than depression 13. For instance, by way of example, FIG. 2 illustrates that depression 14 is narrower along the length direction of the ridge than depression 13 and is recessed less (e.g., shallower) toward the second side surface of the ridge than depression 13.

Depression 11, depression 12, depression 13, depression 14 or the like are combinable in any useful numbers and combinations. The depressions enhance the strength of the ridge and in return the ridge enhances the strength of the structure.

In some exemplary embodiments, the ridge or the structure includes optional, additional or alternative elements to further enhance the strength. For instance, in some exemplary embodiments, ridge 10 includes one or more protrusions or the like formed at first side surface 16, e.g., protruding from first side surface 16 toward space 20 or in an opposite direction than depression 14. The protrusion can have any suitable shapes and sizes. For instance, in some exemplary embodiments, the protrusion has a lower edge at or adjacent to the lower ridge surface of the ridge and an upper edge at or adjacent to the lower panel surface of the panel. In an exemplary embodiment, ridge 10 includes a plurality of depressions 13 and/or depressions 14, and at least one protrusion between two adjacent depressions 13 and/or depressions 14.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will be understood that the terms "top" or "bottom", "lower" or "upper", and etc. are used to describe features of the exemplary embodiments with reference to the positions of such features as displayed in the figures. It will be understood that, although the terms "first," "second," etc. may be used herein to describe various elements, these elements should not be limited by these terms. These terms are only used to distinguish one element from another. For example, a first depression could be termed a second depression, and, similarly, a second depression could be termed a first depression, without changing the meaning of the description, so long as all occurrences of the "first depression" are renamed consistently and all occurrences of the "second depression" are renamed consistently.

What is claimed is:

1. A blow-molded unitary structure comprising:
   a panel comprising upper and lower panel surfaces; and
   a ridge extending downward beyond the lower panel surface, the ridge comprising:
   a first side surface;
   a second side surface;
   a lower ridge surface joined with the first side and second side surfaces of the ridge; and
   a plurality of depressions formed at one or more of the first side, second side and lower ridge surfaces to enhance a strength of the ridge, the plurality of depressions comprising one or more first depressions and one or more second depressions spaced apart along a length direction of the ridge,
   wherein:
   the first and second depressions are different in length along the length direction of the ridge;
   each depression in the one or more first depressions and the one or more second depressions is recessed from the lower ridge surface toward the upper panel surface, and forms no contact with the first side surface of the ridge; and
   the first side surface is joined with the lower panel surface of the panel.

2. The blow-molded unitary structure of claim 1, wherein the ridge extends downward from a portion of a perimeter of the panel or from the entire perimeter of the panel, wherein the second side surface is joined with the upper panel surface of the panel.

3. The blow-molded unitary structure of claim 1, wherein the panel has a substantially rectangular, square, or circular shape.

4. The blow-molded unitary structure of claim 1, wherein the blow-molded unitary structure is a tabletop, or a tabletop unit.

5. The blow-molded unitary structure of claim 1, wherein each first depression forms no contact with the upper panel surface of the panel.

6. The blow-molded unitary structure of claim 1, wherein each first depression is elongated along the length direction of the ridge.

7. The blow-molded unitary structure of claim 1, wherein the plurality of depressions further comprises one or more third depressions formed at or adjacent to an edge between the lower ridge surface and first side surface of the ridge such that each of the one or more third depressions is recessed from the lower ridge surface toward the lower panel surface of the panel and recessed from the first side surface toward the second side surface of the ridge.

8. The blow-molded unitary structure of claim 1, wherein a second depression in the one or more second depressions is more than 1.5 times longer than a first depression in the one or more first depressions along the length direction of the ridge.

9. The blow-molded unitary structure of claim 1, wherein each first depression in the one or more first depressions has a length that is more than 1.5 times of its width.

10. A blow-molded unitary structure comprising:
    a panel comprising upper and lower panel surfaces; and
    a ridge extending downward beyond the lower panel surface, the ridge comprising:
    a first side surface;
    a second side surface;
    a lower ridge surface joined with the first side and second side surfaces of the ridge; and
    a plurality of depressions formed at one or more of the first side, second side and lower ridge surfaces to enhance a strength of the ridge, the plurality of depressions comprising:
    a plurality of first depressions spaced apart along a length direction of the ridge, each first depression recessed from the lower ridge surface toward the upper panel surface;
    one or more third depressions formed at or adjacent to an edge between the lower ridge surface and first side surface of the ridge such that each of the one or more third depressions is recessed from the lower ridge surface toward the lower panel surface of the panel and recessed from the first side surface toward the second side surface of the ridge; and
    one or more fourth depressions each recessed from the first side surface toward the second side surface of the ridge at a location adjacent to the lower panel surface and joined with a third depression in the one or more third depressions.

11. The blow-molded unitary structure of claim 10, wherein a fourth depression in the one or more fourth depressions has a different dimension along the length direction of the ridge than a corresponding third depression in the one or more third depressions.

12. The blow-molded unitary structure of claim 10, wherein a fourth depression in the one or more fourth depressions is recessed from the first side surface toward the second side surface of the ridge at a different depth than a corresponding third depression in the one or more third depressions.

13. The blow-molded unitary structure of claim 10, wherein a fourth depression in the one or more fourth depressions has a different dimension along the length direction of the ridge than a respective third depression, or the fourth depression is recessed from the first side surface toward the second side surface of the ridge at a different depth than the respective third depression, or both.

14. The blow-molded unitary structure of claim 10, wherein for each respective third depression in the one or more third depression, there is a corresponding fourth depression.

15. The blow-molded unitary structure of claim 10, wherein the ridge extends downward from a portion of a perimeter of the panel or from the entire perimeter of the panel, wherein the first side surface is joined with the lower panel surface of the panel and the second side surface is joined with the upper panel surface of the panel.

16. The blow-molded unitary structure of claim 10, wherein a respective third depression in the one or more third depression is formed in between a corresponding first depression in the one or more first depressions and a corresponding second depression in the one or more second depressions, or in between two adjacent first depressions, or in between two adjacent second depressions.

17. A blow-molded unitary structure comprising:
a panel comprising upper and lower panel surfaces;
a ridge extending downward beyond the lower panel surface, the ridge comprising:
a first side surface;
a second side surface;
a lower ridge surface joined with the first side and second side surface of the ridge; and
a plurality of depressions formed at one or more of the first side, second side, and lower ridge surfaces to enhance a strength of the ridge, the plurality of depressions comprising:
a third depression formed at or adjacent to an edge between the lower ridge surface and first side surface of the ridge such that the third depression is recessed from the lower ridge surface toward the lower panel surface of the panel and recessed from the first side surface toward the second side surface of the ridge but forms no contact with either the lower panel surface of the panel or the second side surface of the ridge; and
a fourth depression recessed from the first side surface toward the second side surface of the ridge at a location adjacent to the lower panel surface and joined with the third depression,
wherein the third depression is longer than the fourth depression along a length direction of the ridge.

18. The blow-molded unitary structure of claim 17, wherein the third and fourth depressions have different dimensions along a length direction of the ridge, or the fourth depression is recessed from the first side surface toward the second side surface of the ridge at a different depth than the third depression, or both.

19. The blow-molded unitary structure of claim 17, wherein the plurality of depressions comprises two or more third depressions spaced apart along the length direction of the ridge and two or more fourth depressions.

* * * * *